Oct. 12, 1948.    J. H. BOOTH    2,451,060
JOINT ASSEMBLY
Filed Oct. 22, 1945
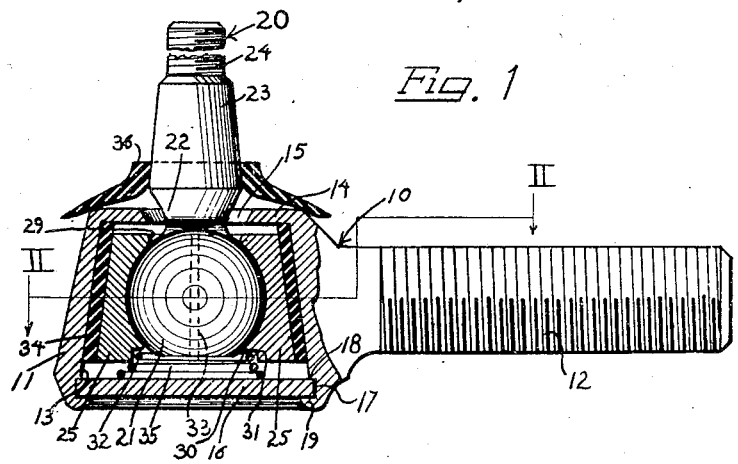
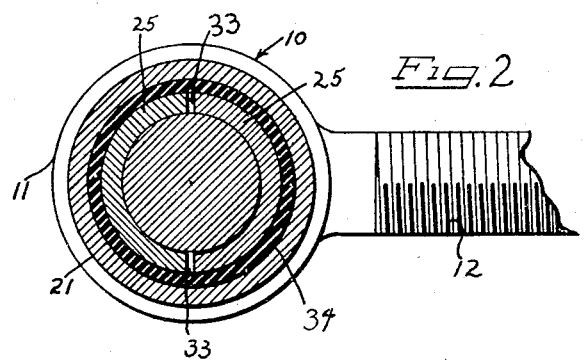
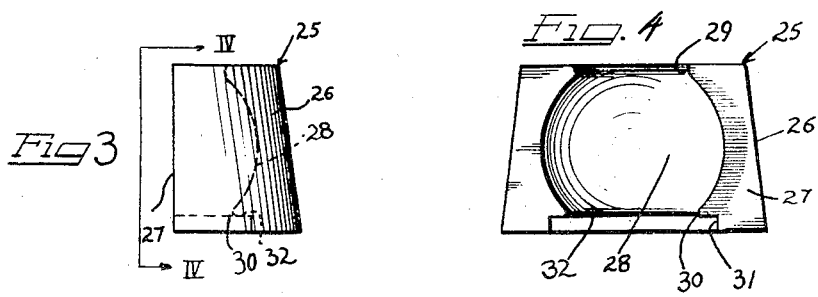
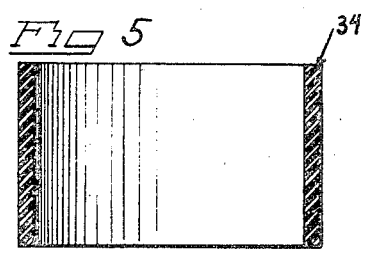
Inventor
James H. Booth
by The Firm of Charles Mellell    Attys.

Patented Oct. 12, 1948

2,451,060

UNITED STATES PATENT OFFICE 2,451,060

JOINT ASSEMBLY

James H. Booth, Detroit, Mich., assignor to Thompson Products, Inc., Cleveland, Ohio, a corporation of Ohio Application October 22, 1945, Serial No. 623,740

2 Claims. (Cl. 287—85)

This invention relates to universal joint assemblies having parts in bearing engagement and equipped with shock absorbing means to protect the bearing surfaces of the parts.

Specifically the invention deals with ball and socket joints especially adapted for tie rod and drag link joint connections in automotive steering assemblies wherein the ball and socket bearing surfaces of the joint are protected from shock loads.

The invention will hereinafter be specifically described as embodied in a ball and socket tie rod joint, but it should be understood that the principles of this invention are applicable to universal joints in general, and the invention therefore is not limited to tie rod joints.

According to this invention a tie rod socket or end is provided for defining a tapered or frusto-conical socket. A ball stud has the ball end thereof disposed in the socket of the housing and surrounded by segmental annular seats. A pair of such seats is generally used. Each seat has a tapered or frusto-conical outer wall of about the same taper as the socket. The seats are open-ended and have fragmental ball-shaped recesses between the open ends thereof providing bearing surfaces to accommodate tilting and rotating movements of the ball end of the stud. The shank of the stud projects freely through one open end of the seats. The opposite open ends of the seats have recessed end faces receiving the end coil of a spring which urges the seats toward the small end of the tapered socket. The socket chamber is closed by a plate preferably spun into the housing. In accordance with this invention, the seats are surrounded by a rubber sleeve which, in its free state, is in the shape of a circular tube. The sleeve is stretched over the tapered outer surfaces of the seats surrounding the ball end of the stud and is inserted into the tapered socket of the housing to fill the space between the seats and the tapered socket wall. The rubber sleeve absorbs shock loads imparted to the assembly and insures a good fit between the seats and the sockets since it can be deformed to accommodate irregularities of the tapered surfaces of these parts. The recesses in the end faces of the seats hold the spring in center relation in the sockets so that it cannot damage the rubber sleeve and will always act on the seats.

The seats are separated from each other around the ball end of the stud to provide gaps therebetween and these gaps are decreased in width as wear develops on the bearing surfaces to cause the seats to always have full bearing engagement with the ball end of the stud. The spring, as explained above, urges the seats toward the small end of the socket and thereby provides an automatic wear take-up for the bearing surfaces.

It is, then, an object of this invention to provide universal joint assemblies having parts in bearing engagement which are protected by shock absorbing means.

Another object of the invention is to provide a ball and socket joint with fragmental annular ball seats cushioned in resilient deformable material.

A specific object of the invention is to provide a ball and socket joint having a ball-ended stud in bearing engagement with a plurality of bearing seats which are surrounded by a rubber sleeve arranged to absorb shock loads on the bearing surfaces to protect the bearing surfaces.

Another specific object of the invention is to provide a ball and socket tie rod joint with axially split bearing seats for the ball end of the stud wherein the seats and the joint housing have converging walls separated by a shock absorbing rubber sleeve and wherein a spring urges the seats in the direction of convergence of the socket bearing wall to automatically compensate for wear developed on the bearing surfaces.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view, with parts in vertical cross section and with parts broken away, of a ball and socket tie rod joint according to this invention.

Figure 2 is a fragmental horizontal cross-sectional view with parts in plan, taken along the line II—II of Figure 1.

Figure 3 is a side elevational view of one of the ball seats for the joint shown in Figures 1 and 2.

Figure 4 is an end elevational view of the ball seat of Figure 3 taken along the line IV—IV of Figure 3.

Figure 5 is an axial cross-sectional view of a rubber shock absorbing sleeve for the joint assembly.

As shown on the drawings:

As shown in Figures 1 and 2, the joint 10 of this invention includes a housing 11 with a laterally extending externally threaded stem 12. The stem 12 is adapted to be threaded into the end of a tie rod or the like (not shown). The housing 11 has a frusto-conical bore 13 therein converging to an end wall 14. The end wall 14 has a central aperture 15 therethrough. The end of the housing remote from the end wall 14 is closed by a plate 16 which is seated in a cylindrical counterbore 17 against a shoulder 18 and held in fixed relation to the housing by a spun-over portion 19 of the housing.

The ball stud 20 has the ball end 21 thereof disposed in the central portion of the socket chamber defined by the bore 13 of the housing 11. The stud 20 has a neck portion 22 projecting freely through the aperture 15 of the housing and diverging to the large end of a frusto-conical shank portion 23 adapted to receive the eye end of a steering arm or the like (not shown) therearound. A threaded cylindrical end portion 24 extends from the converging end of the shank portion 23.

A pair of axially divided fragmental annular ball seats 25, 25 surround the ball end 21 of the stud in the housing 11. Each seat 25, as best shown in Figure 2, is of fragmental circular cross section and, as shown in Figures 3 and 4, has a tapered outer wall 26, a flat side face 27, a fragmental spherical recess 28 in the flat face 27, a fragmental circular opening 29 in one end thereof, a larger fragmental spherical opening 30 in the other end thereof, and a recess 31 in the bottom face thereof extending from the opening 30 and providing a shoulder 32 around the opening 30.

The recesses 28 of the ball seats 25 receive the ball end 21 of the stud and substantially surround this ball end except at the top and bottom thereof and along gaps 33 between the side faces 27 of the seats as best shown in Figure 2. The neck 22 of the stud projects freely through the openings 29 in the seats 25 and the free end of the ball portion 21 of the stud projects through the openings 30 of the seats into the recess 31 as best shown in Figure 1. The tapered outer walls 26 of the seats have about the same taper as the bore 13 of the housing 11 and converge in the same direction as the bore.

The seats, when disposed around the ball end 21 of the stud, have their outer walls 26 spaced from the bore 13 of the housing by a rubber sleeve. The rubber sleeve, in its free state, is in the form of a cylindrical tube as best shown in Figure 5 and has an inside diameter adapted to snugly fit around the small ends of the walls 26 of the seats when the same are disposed around the ball 21. The rubber tube is stretched to fit around the large ends of the seats and, when so deformed, it will have a tapered contour snugly fitting the bore 13 of the housing 11 as shown in Figure 1.

A coil spring 35 is held under compression between the closure plate 16 and the shoulder 32 of the recess 31 in the ball seats to surround the portion of the ball 21 which projects in the recess.

The spring 35 urges the seats 25, 25 toward the small end of the bore 13 to maintain the fragmental spherical walls of the recesses 28 of the seats in full bearing engagement with the ball end 21 of the stud and, as wear develops on these bearing surfaces, the gaps 33 will decrease in width and the seats 25 will be moved closer together to compensate for the wear. The ball end of the stud thus always has full bearing engagement with the ball seats and will tilt and rotate in these ball seats. The rubber sleeve absorbs any shock loads imparted on the joint parts to protect the bearing surfaces of the parts and at the same time insures a better fit between the conical surfaces of the housing and seats.

The ball seats can be composed of rigid plastic material or of self-lubricating metal bearing material such as graphite-impregnated bronzes or the like. The assembly therefore need not be lubricated.

A dust cap 36, as shown in Figure 1, snugly receives the stud shank portion 23 therethrough and rides on top of the housing to seal the aperture 15 of the housing against ingress of dirt.

From the above descriptions it will, therefore, be understood that the universal joint of this invention is preferably a ball and socket joint equipped with fragmental annular bearing seats receiving the ball portion of the joint in tiltable and rotatable relation and surrounded by shock absorbing material that will protect the bearing surfaces against shock loads. It will also be understood that an automatic wear take-up arrangement is provided by spring pressing the ball seats toward the small end of a converging bore in a housing.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball and socket joint comprising a housing having a tapered bore and an apertured end wall at the converging end of the bore, a closure plate secured to said housing at the large end of the bore, a stud having a shank projecting freely through the aperture in said wall of the housing and a ball end in the housing, a pair of fragmental annular rigid bearing seats in said housing on opposite sides of the ball end of the stud therein, each seat having an outer wall converging in the same direction as the bore of the housing in spaced relation from the housing, each seat having spaced opposed flat side faces and fragmental spherical recesses in said side faces, said seats having openings in the tops and bottoms thereof communicating with said recesses, said bottoms of the seats having recesses therein terminating in shoulders, said openings in the tops of the seats receiving the shank of the stud freely therethrough, said openings in the bottoms of the seats receiving the end of the ball therethrough, a spring bottomed on the closure plate and seated on the shoulders of said seats in said bottom recesses thereof, and a relatively thin sleeve of resilient material interposed between the tapered outer walls of the seats and the bore for fitting the seats in the housing and for absorbing shock loads to protect the bearing surfaces of the studs and seats.

2. A joint assembly comprising a housing defining a tapered conical chamber, a headed stud having the headed portion thereof in said chamber, spaced opposed rigid fragmental annular bearing seats receiving the headed portion of the stud in tiltable and rotatable relationship, said seats having tapered conical outer walls converging in the same direction as the tapered conical walls of the housing, means in said chamber urging the seats in the direction of convergence of said tapered conical walls, and a relatively thin resiliently deformable sleeve disposed around the tapered conical walls of the seats and deformed thereby to provide an outer tapered conical wall fitting the tapered conical wall of the chamber, said sleeve being adapted to absorb shock loads for cushioning said seats.

JAMES H. BOOTH.

REFERENCES CITED

The following references are of record in the file of this patent:

UNITED STATES PATENTS

| Number | Name | Date |
|---|---|---|
| 1,909,100 | Geyer | May 16, 1933 |
| 1,940,466 | Sneed | Dec. 19, 1933 |
| 2,273,415 | Nickelsen | Feb. 17, 1942 |
| 2,280,634 | Flumerfelt | Apr. 21, 1942 |
| 2,325,845 | Flumerfelt | Aug. 3, 1943 |

FOREIGN PATENTS

| Number | Country | Date |
|---|---|---|
| 582,421 | Germany | Mar. 2, 1929 |